April 20, 1926. 1,581,788
C. V. CORNFORTH
SIDE SCREEN ATTACHMENT FOR THE WEATHER SHIELDS OF MOTOR VEHICLES
Filed Oct. 2, 1924
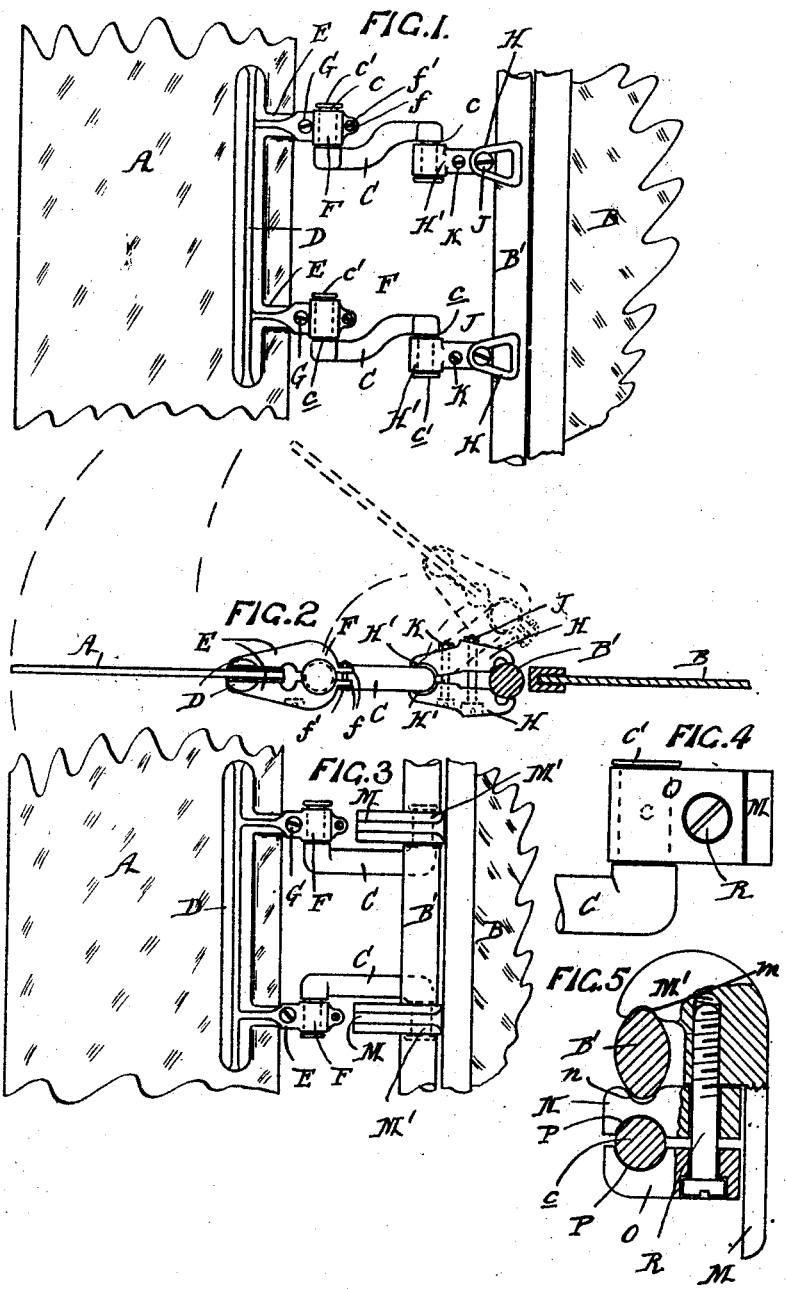

Patented Apr. 20, 1926.

1,581,788

UNITED STATES PATENT OFFICE.

CLAUDE VINCENT CORNFORTH, OF WELLINGTON, NEW ZEALAND.

SIDE-SCREEN ATTACHMENT FOR THE WEATHER SHIELDS OF MOTOR VEHICLES.

Application filed October 2, 1924. Serial No. 741,177.

*To all whom it may concern:*

Be it known that I, CLAUDE VINCENT CORNFORTH, subject of the King of Great Britain, residing at Selwyn Hotel, Clyde Quay, Wellington, in the Dominion of New Zealand, have invented new and useful Improvements in Side-Screen Attachments for the Weather Shields of Motor Vehicles, of which the following is a specification.

This invention relates to the usual form of side screen attachment to the wind shields of motor car and like vehicles, formed by a glass plate that is arranged to extend edge on with each side edge of the wind shield and is attached to the wind shield frame by bracket fittings designed to permit of the screen being moved to any desired angle with the surface plane of the wind shield.

The invention has been devised with the object of providing improved fittings for use in the attachment of the screen, such fittings being so constructed and mounted as to allow for the screen being readily and firmly positioned at any desired angle, and particularly to provide for the screen being swung right out or right in flat against the surface of the shield in order thus that the weather curtains of the car may be placed in their usual positions without obstruction. The construction also is such that provision is made for an opening between the edge of the screen and the shield should such be desired for ventilation purposes.

The construction, however, embodies as one of its principal features of novelty, special clamping means for holding the plate glass of the screen in such a manner that it is gripped firmly and over a fair proportion of its height so that any possibility of breakage by torsion on the glass through strain or vibration is largely overcome. Such means also are of such a nature as to form a minimum obstruction to the car driver's view.

The essential features of construction are shown in the accompanying drawings as embodied in two methods of carrying out the invention, especially with regard to the manner in which the bracket supports for the screen are made and attached to the weather shield.

In such drawings:—

Figure 1 is a front face view of a screen mounted upon the wind shield, showing it positioned straight out from the shield in order to clearly illustrate the construction and working of its mountings, according to one manner carrying out the invention.

Figure 2 is a plan thereof, but showing the srceen also in dotted lines in its usual running position.

Figure 3 is a similar view to Figure 1, but illustrating the second manner of carrying out the invention.

Figure 4 is a back elevation, on a full sized scale, of one of the bracket attachments for securing to the weather shield, as used with the fittings shown in Figure 3.

Figure 5 is a plan thereof, drawn partly in section.

In carrying out the invention according to both forms shown in the drawings, the screen plate A is attached to the edge of the weather shield B by means of a pair of double crank arms C—C each having a vertical journal pin *c* on each end. Each crank arm has its two journal pins *c* journalled in bracket bearings affixed respectively to the side bar B' of the weather shield, and to the screen, so that they may turn in such bearings. This therefore provides for the screen being extended outward to leave a space between its inner edge and the edge of the shield, and bent backwards at any desired angle, or for being turned in with its inner edge behind the edge of the shield and then bent backwards at the ordinary running angle, as shown by the dotted lines in Figure 2. Or, the screen may be swung right in to lie flatly against the inside of the shield, or arranged in any position rendered possible by the double crank mounting of the screen thus provided for.

In both forms of the device also, the screen plate A is held by being engaged on each face by a clamping bar D extending up such face near its inner edge. The two bars are arranged in coincidence with each other, and each one, at each of its upper and lower ends, is formed with a lateral extension E projecting at right angles beyond that edge of the screen plate. This extension, at its end is shaped to form a half journal for fitting on one side of the crank journal pin c on the corresponding end of the crank C, so that with the half journal on the other side, a complete journal bearing F is formed for turning on such pin. The two clamping bars are secured together to grip the screen between them, by means of the screw G passing laterally through the extensions E at the top and bottom, alongside the edge of the screen. This screw also serves to hold the two halves of the journal bearing F together and to tighten them more or less around the crank pin c, but if required, the two halves may be further secured together by forming the inner edge of each with a lug f and passing a small screw f' through both lugs. The journals F are retained on the crank pins c by being engaged by enlarged heads c' formed or secured upon such pins.

The two ways of carrying out the invention differ only in the means employed to journal the inner ends of the double cranks C upon the side bar B' of the weather shield.

These means, in the form shown in Figures 1 and 2, for each crank arm C, provide for a clamp journal to clamp upon the bar B' at the requisite distance from the other to accord with the positions assumed by the respective crank pins c on the inner ends of the crank arms. Each of such clamps is formed in two parts H—H each of which at its inner end is adapted to fit upon the front, or rear face of the bar and at its outer end is made with a half journal bearing H' that forms with the other half bearing, a full journal bearing to receive the crank pin c. The two halves are caused to grip the shield bar by means of a screw bolt J passed laterally through them, adjacent to such bar and are caused to close around the journal pin c with a more or less tightened engagement, by the second screw bolt K passed laterally through them, close up to such bearing. In this arrangement also the crank pin is formed with an enlarged end to retain it within the journal bearing.

It will be seen that by the adjustment of the necessary screws, the journal bearings F and H' may be tightened upon the crank pins to such an extent as to provide a frictional resistance against their relative turning and thereby to ensure that the screen will be retained in the position or angle to which it is adjusted.

In this form of the invention, the crank arms are disposed so that the outer pins c or both arms extend upwards within their respective journal bearings F while the inner pins c extend downwards in their journals H', the crank arm being curved downwards from its inner to its outer end to bring the two pins into an overlapping horizontal alignment and thereby to obtain a better turning effect and also to somewhat reduce the vertical space taken up by the fittings.

In the form of the invention shown in Figures 3 to 5 the two pins c of the upper crank arm are disposed to extend upwards, while those of the lower crank arm are disposed to extend downwards.

In this form the journal bearing bracket for attachment to the side bar of the shield is made in three parts and a clamping screw, so designed and arranged that by the operation of the screw the bracket is clamped to the said bar and the journal bearing for the crank pin is closed. Its construction also provides for its ready fitting to any shape or size of said bar.

The fitting has one of its parts M made of right angle form in plan so that one member M' may extend in across the front of the bar B' and the other then extend rearwards alongside such bar, such member M' having a groove m formed vertically on its inner face to fit on to such bar. The other two parts are formed by metal blocks N and O that are designed to extend edge on, adjacent to one another, from the inside of the rearwardly extending member of the part M and in parallel lines with the member M' of such part. The two parts are formed on their adjacent faces with vertical coincidentally arranged semi-circular grooves P that together form a bearing to receive the pin c of the crank arm concerned. The forward face of the part N is made with a vertical groove n that is adapted to fit over the rear edge of the bar B'.

The screw pin R is made to extend through from the rear and to pass freely through the parts N and O and then to screw into the part M. Its head is recessed into the rear surface of the part O so that when the parts are assembled on the shield bar B' and the crank pin c placed in its position, the screwing in of the screw will cause the two parts N and O to tighten around the crank pin and the bar B' to be clamped between the part N and the member M' of the part M. Thus a rigid connection is made that will provide a firm bracket bearing for the crank arm to turn in. In this case also the frictional grip of the journal bearings upon the respective crank pins will provide the necessary resistance to hold the screen in its adjusted position.

I claim:—

In side screen attachments to the weather shields of motor vehicles, a pair of clamping bars arranged to extend one up each face of the screen, near its inner edge and in a coincident position with the other bar, and each formed with lateral extensions near the respective upper and lower ends that project coincidently with those of the other bar beyond the screen edge and form between their ends a vertically extending journal bearing, and a clamping screw passing laterally through both extensions to cause the bars to grip the screen between them, in combination with pivoting means engaging in such journal bearings and pivotally attached to the shield edge, substantially as specified.

In testimony whereof, I affix my signature.

CLAUDE VINCENT CORNFORTH.